United States Patent
Delobel et al.

(10) Patent No.: US 10,196,053 B2
(45) Date of Patent: Feb. 5, 2019

(54) METHOD FOR ENERGY MANAGEMENT OF A RECHARGEABLE TRACTION BATTERY OF A HYBRID VEHICLE

(71) Applicant: RENAULT s.a.s., Boulogne-Billancourt (FR)

(72) Inventors: Bruno Delobel, Paris (FR); Antoine Saint-Marcoux, Palaiseau (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 15/538,251

(22) PCT Filed: Dec. 18, 2015

(86) PCT No.: PCT/FR2015/053648
§ 371 (c)(1),
(2) Date: Jun. 21, 2017

(87) PCT Pub. No.: WO2016/102856
PCT Pub. Date: Jun. 30, 2016

(65) Prior Publication Data
US 2017/0369048 A1    Dec. 28, 2017

(30) Foreign Application Priority Data
Dec. 22, 2014   (FR) ..................... 14 63053

(51) Int. Cl.
*B60W 20/00* (2016.01)
*H02J 7/00* (2006.01)
(Continued)

(52) U.S. Cl.
CPC .......... *B60W 20/00* (2013.01); *B60L 11/1857* (2013.01); *B60L 11/1859* (2013.01);
(Continued)

(58) Field of Classification Search
USPC .......................................................... 701/22
See application file for complete search history.

(56) References Cited

U.S. PATENT DOCUMENTS

2003/0184307 A1* 10/2003 Kozlowski ............ B60L 3/0046
324/427
2012/0016547 A1    1/2012 Aridome et al.
(Continued)

FOREIGN PATENT DOCUMENTS

| | | |
|---|---|---|
| EP | 2404801 A1 | 1/2012 |
| FR | 2995859 A1 | 3/2014 |
| GB | 2461350 A  | 1/2010 |

OTHER PUBLICATIONS

International Search Report dated Mar. 23, 2016, in PCT/FR2015/053648, filed Dec. 18, 2015.
(Continued)

*Primary Examiner* — Tyler D Paige
(74) *Attorney, Agent, or Firm* — Oblon, McClelland, Maier & Neustadt, L.L.P.

(57) ABSTRACT

A method manages a state of charge of a traction battery of a rechargeable hybrid vehicle including a hybrid power train to provide propulsion. The battery being capable of operating according to a first operating mode over a state of charge range, of which an amplitude is bounded by predefined maximum and minimum state of charge values, in which the battery supplies substantially all power necessary for propulsion, and a second operating mode, in which the state of charge of the battery is kept substantially constantly around an equilibrium state of charge value. The method includes estimating an ageing state of the battery, comparing the estimated ageing state of the battery in relation to a given ageing state threshold, and reducing the amplitude of the
(Continued)

state of charge range linked to the first operating mode when the ageing state of the battery rises above the given ageing state threshold.

6 Claims, 2 Drawing Sheets

(51) Int. Cl.
  *B60L 11/18* (2006.01)
  *B60W 20/13* (2016.01)
  *B60W 10/26* (2006.01)
  *H02J 7/04* (2006.01)
(52) U.S. Cl.
  CPC .......... *B60L 11/1862* (2013.01); *B60W 20/13* (2016.01); *H02J 7/0073* (2013.01); *B60W 10/26* (2013.01); *B60W 2510/248* (2013.01); *B60W 2710/244* (2013.01); *H02J 7/042* (2013.01); *H02J 2007/0067* (2013.01); *Y02T 10/6269* (2013.01); *Y02T 10/7005* (2013.01); *Y02T 10/705* (2013.01); *Y02T 10/7044* (2013.01)

(56) References Cited

U.S. PATENT DOCUMENTS

| | | | |
|---|---|---|---|
| 2012/0029724 A1* | 2/2012 | Formanski | H01M 10/443 700/300 |
| 2012/0074960 A1* | 3/2012 | Minarcin | B60L 11/1861 324/658 |
| 2012/0112754 A1 | 5/2012 | Kawai | |
| 2013/0027048 A1 | 1/2013 | Schwarz et al. | |
| 2013/0113433 A1 | 5/2013 | Shibata et al. | |
| 2014/0229043 A1* | 8/2014 | Frank | B60W 20/20 701/22 |
| 2015/0232082 A1* | 8/2015 | Frank | B60W 20/10 701/22 |

OTHER PUBLICATIONS

French Search Report dated Nov. 9, 2015, in French patent Application No. 1463053, filed Dec. 22, 2014.

* cited by examiner

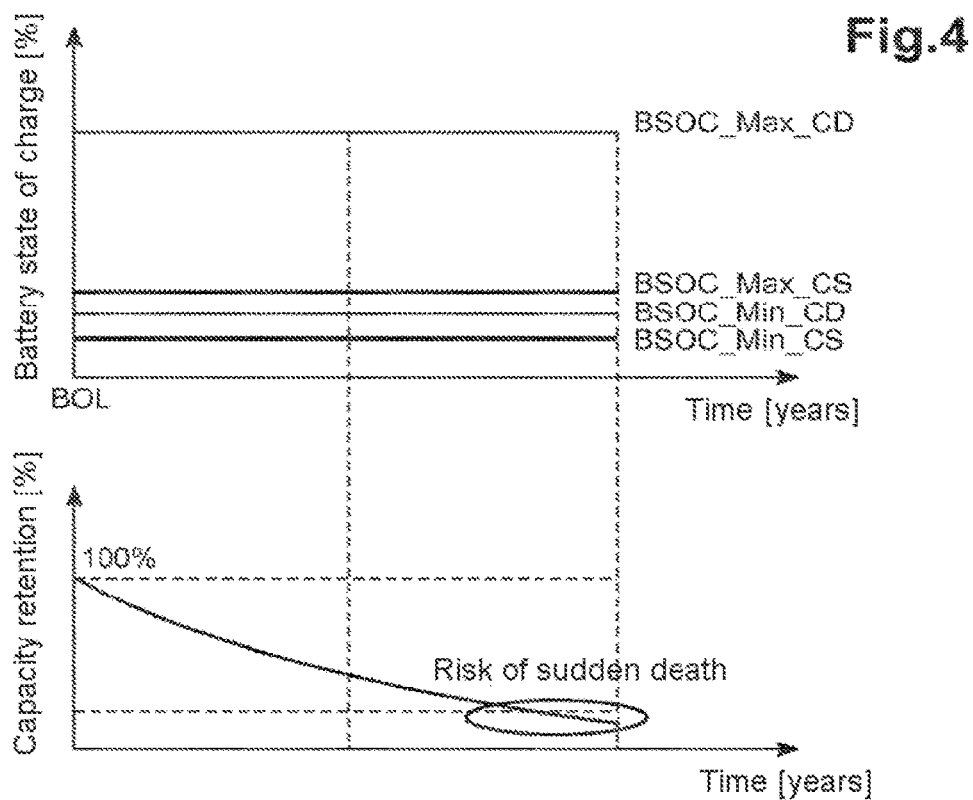
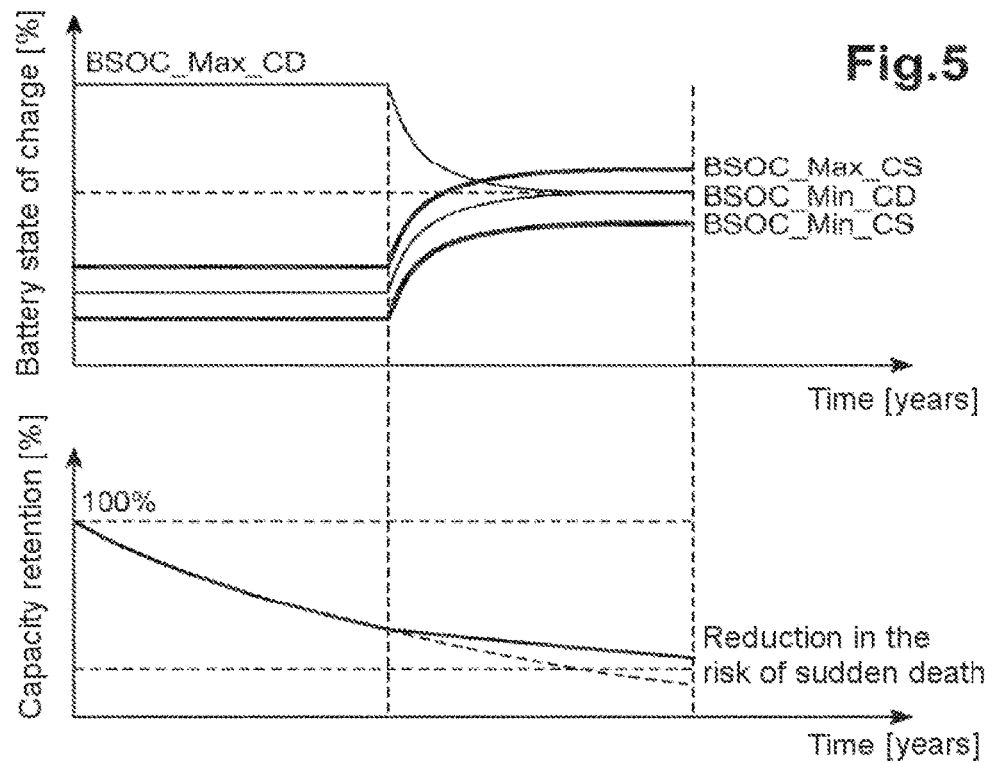

METHOD FOR ENERGY MANAGEMENT OF A RECHARGEABLE TRACTION BATTERY OF A HYBRID VEHICLE

BACKGROUND

The invention relates to a method for managing the state of charge of a traction battery of a rechargeable hybrid vehicle, comprising a hybrid power train of the type comprising a combustion engine disposed for propulsion and an electric motor/generator disposed for propulsion.

Rechargeable hybrid vehicle is the term used when a hybrid vehicle, having two independent energy sources, can be recharged on the electrical grid, which makes it possible to have a greater autonomy in electric mode than a conventional hybrid vehicle. In fact, the traction battery, which powers the electric motor, is conventionally recharged by the combustion engine when running, or by using the kinetic energy of the vehicle, and an additional option then consists of being able to recharge the battery by connecting it to the electrical grid.

In the context of combustion/electric hybrid motorization, the "Plug-in Hybrid Electric Vehicle" (PHEV) technology is known in particular, in which the two motorizations act together to propel the vehicle. The use of the electric mode will depend on the configuration of the vehicle. Two main operating modes exist in particular:

In an operating mode known as "Charge Depleting" (CD), corresponding to a "Zero Emission Vehicle" (ZEV) operating mode, the battery supplies substantially all or virtually all of the power necessary for propulsion. In an operating mode described as "Charge Sustaining" (CS), the battery supplies only a complement of power, the essential part of the power necessary for propelling the vehicle then being supplied by the combustion engine. The latter mode corresponds to an operating mode similar to the "Hybrid Electric Vehicle" (HEV) mode.

Depending on the power setting intended to be transmitted to the driving wheels of the vehicle and on the energy management law implemented by the energy management system of the vehicle, typically a high performance computer, for example a general supervisor of the power train, the vehicle will operate either in CD mode or in CS mode.

Conventionally, as illustrated in FIG. 1, in the case where the driving phase starts with the battery having a high state of charge, for example, at full charge SOC_Max, the vehicle is used in CD operating mode and the energy management system will allow the state of charge of the battery to drift in this operating mode until a predefined minimum state of charge value SOC_Min_CD is reached. Once this condition is reached, the driver has the possibility of being able to continue to drive in CS mode, in which the state of charge of the battery is kept constantly around this predefined minimum value.

As a variant, as illustrated in FIG. 2, the driver can also impose a CS operating mode, even when the state of charge of the battery remains at a high value, around which the state of charge of the battery will be kept in CS mode, in order to save the CD mode for the end of the journey, for example for arriving in town. However, as in the operation illustrated in FIG. 1, when the state of charge of the battery will have reached the predefined minimum value SOC_Min_CD in CD mode, the energy management system of the vehicle will automatically control the switchover to CS mode.

It appears that the utilization range of the battery, that is to say, the state of charge range over which the driver can use the battery, both charging and discharging, is an important parameter taken into account by the energy management law that allows the operating mode of the vehicle to be defined.

The utilization range of the battery is characterized in particular by the permitted maximum state of charge of the battery, that is to say, the maximum state of charge beyond which the battery is not permitted to rise. Too high a permitted maximum state of charge encourages rapid deterioration of the state of health of the battery, whereas too low a permitted maximum state of charge causes detriment in terms of energy available to the driver, in particular in CD mode. A compromise must therefore be found, through suitable management of the end of charge voltage, between the energy it is desired to provide in the short term and the durability of the battery.

The utilization range of the battery is also characterized by the permitted minimum state of charge of the battery, that is to say, the minimum state of charge below which the battery is not permitted to fall. Too high a permitted minimum state of charge is detrimental to the energy available to the driver, in particular in CD mode, whereas too low a permitted minimum state of charge is a problem in so far as there is a risk that the battery will not be able to supply the required minimum power value, in particular in CS mode. A compromise must therefore also be found, through management of the permitted minimum state of charge, between the energy it is desired to provide to the driver (that is to say, the autonomy) and keeping an acceptable level of performance, in particular in terms of minimum available power being discharged from the battery, both in CD mode and in CS mode.

Also, one of the major challenges relates to the durability and to the preservation of the performance of the battery over time. In this respect, the battery suffers two types of ageing. On one hand, ageing known as calendar ageing, which is deterioration of performance linked to the time spent at different states of charge and of temperature, and, on the other, ageing by cycling, which is deterioration linked to the power values that have passed through the battery. Now, today, in particular if it were necessary to be able to have the battery operating in CD mode for the entire life of the battery, it is very difficult to ensure the durability of the battery on account of these ageing constraints. In extreme cases, the battery can go into "sudden death", which is characterized by a drastic increase of the internal resistance of the battery cells and a reduction of its useful capacity.

A method is known, from the patent document FR3002045, for managing the utilization range of a battery depending on the ageing of the latter, which consists, in particular, of estimating the end of charging voltage depending on the state of health in energy of the battery, so as to increase the permitted maximum state of charge and consequently, the useful state of charge range, depending on the ageing state of the battery. Such a method makes it possible to ensure a minimum required energy value, while limiting the deterioration of the battery. However, the durability of the battery still remains limited.

In this context, a need therefore exists for a method for energy management of a battery, exempt from the above-mentioned limitations, and, in particular, which makes it possible to preserve the durability of the battery.

BRIEF SUMMARY

For that purpose, the invention relates to a method for managing the state of charge of a traction battery of a rechargeable hybrid vehicle, comprising a hybrid power train of the type comprising a combustion engine and an electric motor/generator intended simultaneously or independently to provide propulsion, said battery being capable of operating according to a first operating mode over a state of charge range, of which the amplitude is bounded by predefined maximum and minimum state of charge values, in which the battery supplies substantially all of the power necessary for propulsion, and a second operating mode, in which the state of charge of the battery is kept substantially constantly around an equilibrium state of charge value, said method being characterized in that it comprises steps of:

estimating an ageing state of the battery,
comparing the estimated ageing state of the battery in relation to a given ageing state threshold, and
reducing the amplitude of the state of charge range linked to the first operating mode when the ageing state of the battery rises above the given ageing state threshold.

According to a preferred embodiment, the amplitude of the state of charge range linked to the first operating mode is reduced progressively, depending on the ageing state, down to a zero amplitude, so that the battery operates exclusively according to the second operating mode when the zero amplitude of the state of charge range linked to the first operating mode is reached.

Advantageously, the step of reducing the amplitude of the state of charge range linked to the first operating mode consists of making predefined said maximum value and said minimum value of the state of charge converge one towards the other.

The step of estimating the ageing state of the battery preferably comprises the definition of the state of health in energy of the battery.

As a variant or in combination, the step of estimating the ageing state of the battery comprises the definition of the time elapsed since the entry into service of the battery.

As a variant or in combination, the step of estimating the ageing state of the battery comprises the definition of a number of full charges of the battery.

As a variant or in combination, the step of estimating the ageing state of the battery comprises the definition of the sum of the quantities of energy discharged from the battery, operating according to the first operating mode and/or the second operating mode, since the entry into service of the battery.

Advantageously, the maximum and minimum state of charge values predefined for the first operating mode of the battery are defined according to a cartography linking the estimated ageing state of the battery to each of these values.

The invention furthermore relates to a device for managing the state of charge of a traction battery of a hybrid power train of a rechargeable hybrid vehicle, comprising a combustion engine and an electric motor/generator intended simultaneously or independently to provide propulsion, said device comprising means for controlling the battery, capable of controlling the battery according to a first operating mode over a state of charge range, of which the amplitude is bounded by predefined maximum and minimum state of charge values, in which the battery supplies substantially all of the power necessary for propulsion, and according to a second operating mode, in which the state of charge of the battery is kept substantially constantly around an equilibrium state of charge value, characterized in that the controlling means are capable of receiving an estimation of an ageing state of the battery, and of controlling a reduction of the amplitude of the state of charge range linked to the first operating mode when the ageing state of the battery rises above a given ageing state threshold.

The invention furthermore relates to a rechargeable hybrid motor vehicle comprising a traction battery and a device for managing the state of charge of the battery according to the invention.

BRIEF DESCRIPTION OF THE DRAWINGS

Other particularities and advantages of the invention will emerge on reading the description given below of a particular embodiment of the invention, given as an indication, but not limitative, with reference to the attached figures, wherein:

FIG. 4 illustrates the evolution of these utilization ranges of the battery over time, without implementation of the present invention, FIG. 5 illustrates the evolution of these utilization ranges of the battery over time, when the invention is implemented.

DETAILED DESCRIPTION

Figure 1:
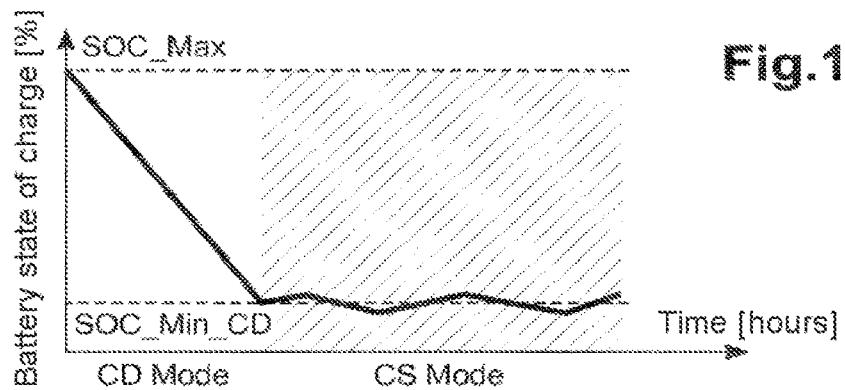
FIGS. 1 and 2, which have already been described, illustrate the evolution of the state of charge of the battery as a function of time according to two known embodiments implementing the two operating modes, respectively the mode CD and the mode CS.
Figure 2:
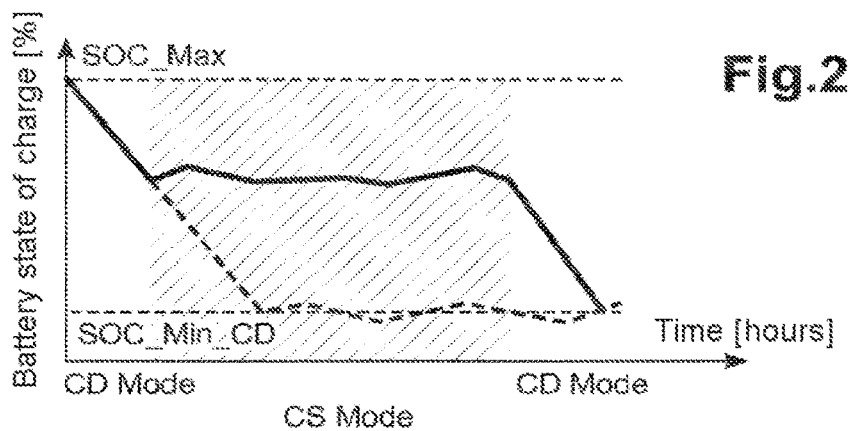

The variables that will be used in the continuation of the description are listed below:

BSOC: battery state of charge (SOC is the acronym for State of Charge)–unit [%], SOHE: the state of health in energy of the battery–unit [%]. The state of health in energy is an indicator of the ability of the battery to supply a required minimum energy value and is defined below as being the relation between, on one hand, the energy that can be discharged with the battery fully charged, at a reference temperature (for example 25° C.), at a constant reference current value (for example 1C), until the cutoff voltage (for example 2.5V) is reached, at a given moment in the life of the battery, and on the other, the energy that can be discharged with the battery fully charged in the same conditions, when it is new. Thus, at the start of life, this relation is 100% and it reduces gradually. In fact, during the life of a battery, its health (performance) tends to deteriorate progressively due to irreversible physical and chemical changes, which occur during use and ageing, until the battery is finally no longer usable. The SOHE therefore reflects a state of health of the battery and its ability to deliver the specified performance in terms of available energy compared with a new battery.

As was explained previously, the deterioration or ageing of the battery is linked on one hand to calendar deterioration (the battery spends time at a certain temperature and a certain given state of charge), and on the other, to deterioration by cycling (linked to the kWh discharged or charged in the battery). However, in CS mode, the contribution of deterioration linked to cycling is virtually non-existent. In fact, the polarization of an electrochemical cell of the battery linked to cycling is less in CS mode than in CD mode, because the average value of the current is zero overall in CS mode, in so far as the battery cycles around a given state of charge; whereas in CD mode, the mean value of the current is negative, since, on average, the battery is being discharged. A first way of preserving durability therefore consists of prohibiting the CD mode, which contributes most to the deterioration of the battery in certain conditions. Such a strategy for energy management of the battery therefore amounts to making the battery cycle around a fixed state of charge value, since, the CD mode then being prohibited, the battery operates in CS mode, in which the state of charge of the battery is kept, on average, constantly around this equilibrium state of charge value.

Furthermore, the influence of calendar deterioration on an electrochemical cell is less for a cell in a low state of charge (at a given temperature value) than one in a high state of charge. An optimum strategy for preserving durability would therefore consist of making the battery cycle in CS mode around an equilibrium state of charge value that would be as low as possible. However, this equilibrium state of charge cannot be too low, so as to be able to preserve a sufficient available discharge power value, including at low temperature.

On account of the above, the key point of the energy management strategy according to the invention consists of curbing, even prohibiting, the operation of the battery in CD mode from the moment the ageing of the battery is above a given ageing state threshold. When the CD mode is prohibited, the hybrid power train of the vehicle is then controlled to operate exclusively in CS mode, which amounts to making the battery cycle around a fixed BSOC value and hence to reducing the utilization range at BSOC of the battery, and to imposing operation of the vehicle in CS (or HEV) mode, so that the largest part of the power delivered to the wheel comes from the combustion engine.

The implementation of this strategy by the supervisor of the hybrid power train therefore involves estimating the ageing state of the battery and comparing this estimated ageing state in relation to the threshold fixed by the strategy. In particular, this ageing state of the battery can be defined through an estimation of the state of health in energy (SOHE) of the battery.

This estimation can for example be performed by the Battery Management System (BMS) computer dedicated to the battery. The BMS computer is provided in this way to estimate the state of health in energy (SOHE) of the battery. Several methods exist for estimating the state of health in energy of the battery. As an example, it will be possible to use for this estimation one of the methods disclosed in the patent "METHOD AND APPARATUS OF ESTIMATING STATE OF HEALTH OF BATTERY" (US2007/0001679 A1) or in the article "R. Spotnitz, "Simulation of capacity fade in lithium ion batteries", Journal of Power Sources 113 (2003) 72-80".

The implementation of the energy management strategy also consists of defining the way of passing from a situation in which the supervisor of the hybrid power train permits operation according to the CD mode, as a complement to the CS mode, to a situation where operation according to the CD mode is no longer permitted.

Thus, according to a first embodiment, this transition can take place from the moment when the ageing state of the battery, preferably estimated by the BMS by means of the SOHE calculation, rises above a given threshold. For example, if this threshold is 60%, as long as the state of health in energy of the battery is above 60%, the supervisor permits operation in CD mode. The driver will then be able to make part of his/her journey in CD mode, and the end of the journey in CS mode. In contrast, as soon as the state of health in energy drops below 60%, in other words, the ageing state of the battery rises above the fixed ageing state threshold, the supervisor is designed to prohibit operation in CD mode, so that the driver will be obliged to make his/her entire journey in CS mode. However, according to this embodiment, the transition between the two situations (that is to say, with and without permission to operate in CD mode) takes place suddenly, which is not particularly desirable.

Also, according to another embodiment, this transition can take place on the basis of a progressive evolution of the BSOC range, permitted as a function of the SOHE. To do this, the BMS defines at each moment a permitted utilization range for the battery, this range potentially depending on the temperature and the ageing. In this context and as illustrated in FIG. 3, there exists, in a general way:

a state of charge range CD_Mode linked to the CD operating mode, of which the amplitude is bounded by a minimum state of charge value BSOC_Min_CD and a maximum state of charge value BSOC_Max_CD; and a state of charge range CS_Mode linked to the CS operating mode, of which the amplitude is bounded by a minimum state of charge value BSOC_Min_CS and a maximum state of charge value BSOC_Max_CS.

Figure 3:
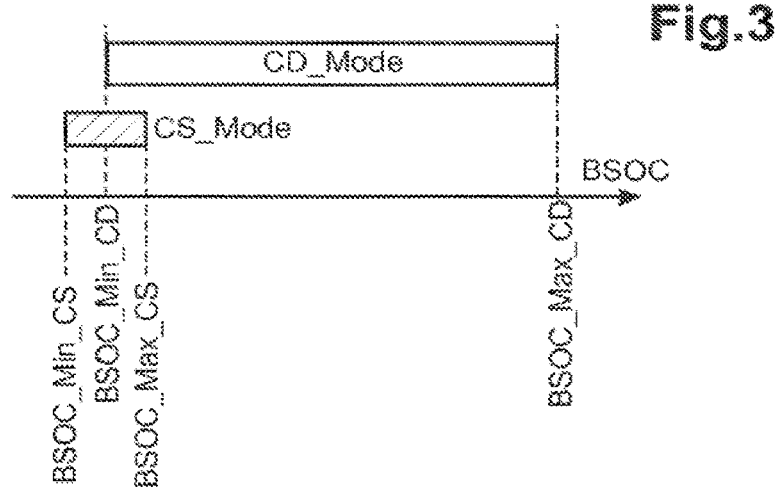
FIG. 3 illustrates the permitted utilization ranges of the battery, linked on one hand, to the operating mode CD and on the other, to the operating mode CS.

These two ranges can be locally superposed as illustrated in FIG. 3.

As illustrated in FIG. 4, if the state of charge range linked to the CD operating mode does not vary over time, there is a risk of the battery deteriorating beyond a threshold, which can cause the sudden death of the cells.

Also, according to the invention, the amplitude of the state of charge range linked to the operating mode CD happens to be reduced, from a given ageing state of the battery. More precisely, below a certain SOHE value, in other words beyond a certain given ageing state threshold of the battery, the amplitude of the state of charge range linked to the CD mode decreases progressively until it reaches a zero value. For example, as illustrated in FIG. 5, the minimum and maximum state of charge values bounding the permitted state of charge range in CD mode, respectively BSOC_Min_CD and BSOC_Max_CD, converge one towards the other until they are equal. When the permitted state of charge range in CD mode has disappeared, the supervisor is designed then to make the battery operate exclusively in CS mode, in which the state of charge of the battery is kept substantially around an equilibrium state of charge value corresponding typically to the convergence state of charge value of the minimum and maximum state of charge values bounding the permitted state of charge range in CD mode. The state of charge of the battery in CS mode is then kept substantially around this convergence value and can increase or decrease slightly between the respective minimum and maximum bounds BSOC_Min_CS and BSOC_Max_CS of the permitted state of charge range CS_Mode in CS mode. As shown in FIG. 5, counting from the implementation of the energy management strategy according to the invention, namely counting from triggering the decrease of the amplitude of the permitted state of charge range in CD mode from a given ageing state threshold, the battery capacity retention rate reduces less rapidly. The method according to the invention therefore makes it possible to improve the battery capacity retention from a given ageing state threshold.

With regard to the estimation of the ageing state of the battery based on the SOHE definition, the latter can be calculated either by a closed loop estimator or by an open loop estimator based on an empirical model. However, the use of a closed loop estimator is not desirable, since, by its construction, it is subject to fluctuations, so that there is a risk that the supervisor would permit or prohibit operating in CD mode in a random manner.

As a variant, the estimation of the ageing state of the battery can be based on the definition of parameters other than the SOHE alone, in particular:
- the time elapsed since the entry into service of the battery;
- the sum of kWh discharged (or charged) in CD mode and/or in CS mode;
- the number of full charges performed.

It will be possible to use such parameters advantageously in order simply to characterize the ageing state of the battery. It will therefore be possible to define the values of BSOC_min_CD, BSOC_max_CD, BSOC_min_CS and BSOC_max_CS through a cartography linking the ageing state of the battery defined through one of these parameters (or a combination of these parameters) to each of these values.

It will be possible advantageously to combine the energy management strategy that is the object of the present invention with other logics for battery state of charge range management. It will therefore be possible to combine the strategy with a strategy for managing the state of charge range aiming to increase progressively the minimum state of charge value of a cell depending on the ageing, so as to preserve the available discharge power. This strategy for managing the state of charge range is based on the physical principle according to which, at a high state of charge, more power is available. It will also be possible to combine the strategy with a strategy for managing the state of charge range consisting of curbing, at the start of life of the battery, the permitted maximum state of charge value, and of increasing it progressively, so as to keep the energy available to the driver for a certain period. These different strategies are advantageously compatible with each other, in so far as the energy management strategy that is the object of the present invention mainly relates to managing the end of life of the battery, in contrast to the abovementioned two other strategies, which relate mainly to the start of life of the battery.

The invention claimed is:

1. A method for managing a state of charge of a traction battery of a rechargeable hybrid vehicle, comprising a hybrid power train of the type comprising a combustion engine and an electric motor/generator intended simultaneously or independently to provide propulsion, said battery being managed by a battery management system computer to operate according to a first operating mode over a state of charge range, of which an amplitude is bounded by predefined maximum and minimum state of charge values, in which the battery supplies substantially all power necessary for propulsion, and a second operating mode, the second operating mode being a hybrid mode in which the state of charge of the battery is kept substantially constantly around an equilibrium state of charge value and the combustion engine supplies an essential part of the power necessary for propulsion, said method comprising:
- estimating, via the battery management system computer, an ageing state of the battery, the ageing state of the battery being a function of at least one of a state of health in energy of the battery, a time elapsed since entry into service of the battery, and a number of full charges of the battery,
- comparing the estimated ageing state of the battery in relation to a given ageing state threshold,
- reducing the amplitude of the state of charge range linked to the first operating mode when the ageing state of the battery rises above the given ageing state threshold progressively to zero, and
- operating the battery exclusively according to the second operating mode when a zero amplitude of the state of charge range linked to the first operating mode is reached such that the battery is prevented from operating according to the first operating mode.

2. The method as claimed in claim 1, wherein the reducing the amplitude of the state of charge range linked to the first operating mode includes making predefined said maximum value and said minimum value of the state of charge converge one towards the other.

3. The method as claimed in claim 1, wherein the estimating the ageing state of the battery comprises defining a sum of quantities of energy discharged from the battery, operating according to the first operating mode and/or the second operating mode, since the entry into service of the battery.

4. The method as claimed in claim 1, wherein the maximum and minimum state of charge values predefined for the first operating mode of the battery are defined according to a cartography linking the estimated ageing state of the battery to each of these values.

5. A device for managing a state of charge of a traction battery of a hybrid power train of a rechargeable hybrid vehicle, comprising a combustion engine and an electric motor/generator intended simultaneously or independently to provide propulsion, said device comprising:
- means for controlling the battery, capable of controlling the battery according to a first operating mode over a state of charge range, of which an amplitude is bounded by predefined maximum and minimum state of charge values, in which the battery supplies substantially all power necessary for propulsion, and according to a second operating mode, the second operating mode being a hybrid mode in which the state of charge of the battery is kept substantially constantly around an equilibrium state of charge value and the combustion engine supplies an essential part of the power necessary for propulsion,
wherein the controlling means are configured to:
- receive an estimation of an ageing state of the battery, the ageing state of the battery being a function of at least one of a state of health in energy of the battery, a time elapsed since entry into service of the battery, and a number of full charges of the battery,
- control a reduction of the amplitude of the state of charge range linked to the first operating mode progressively to zero when the ageing state of the battery rises above a given ageing state threshold, and
- operate the battery exclusively according to the second operating mode when a zero amplitude of the state of charge range linked to the first operating mode is reached such that the battery is prevented from operating according to the first operating mode.

6. A rechargeable hybrid motor vehicle comprising:
a traction battery, and
the device for managing the state of charge of the battery as claimed in claim 5.

* * * * *